(12) United States Patent
Holstine et al.

(10) Patent No.: US 11,279,495 B2
(45) Date of Patent: Mar. 22, 2022

(54) LEG RESTRAINT SYSTEM FOR EJECTION SEATS

(71) Applicant: AMI Industries, Inc., Colorado Springs, CO (US)

(72) Inventors: Steve Holstine, Colorado Springs, CO (US); Justin Keoni Gadino, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 219 days.

(21) Appl. No.: 16/696,814

(22) Filed: Nov. 26, 2019

(65) Prior Publication Data

US 2021/0155348 A1  May 27, 2021

(51) Int. Cl.
*B64D 25/10* (2006.01)
*B64D 11/06* (2006.01)

(52) U.S. Cl.
CPC ............ *B64D 25/10* (2013.01); *B64D 11/062* (2014.12); *B64D 11/0689* (2013.01)

(58) Field of Classification Search
CPC ............ B64D 11/0616; B64D 11/0644; B64D 11/0689; B64D 11/06
See application file for complete search history.

(56) References Cited

U.S. PATENT DOCUMENTS

| | | | | |
|---|---|---|---|---|
| 2,955,786 A | * | 10/1960 | Drew | B64D 25/02 244/122 AG |
| 3,386,683 A | | 6/1968 | Howland | |
| 3,954,234 A | * | 5/1976 | Frost | B64D 25/10 244/151 A |
| 4,081,156 A | * | 3/1978 | Ideskar | B64D 25/02 244/122 AG |
| 4,247,064 A | * | 1/1981 | Schulman | B64D 25/02 244/122 AG |
| 4,508,294 A | * | 4/1985 | Lorch | B64D 25/02 244/122 AG |
| 4,592,523 A | * | 6/1986 | Herndon | B64D 25/02 244/122 AG |
| 4,667,902 A | * | 5/1987 | Zenobi | B64D 25/02 244/122 A |
| 4,871,131 A | | 10/1989 | Bernier et al. | |
| 5,301,903 A | * | 4/1994 | Aronne | B64D 25/02 244/122 AG |
| 5,415,366 A | * | 5/1995 | Mastrolia | B64D 25/02 244/122 AG |
| 6,292,945 B1 | | 9/2001 | Lewis et al. | |
| 6,299,103 B1 | | 10/2001 | Shope et al. | |

(Continued)

FOREIGN PATENT DOCUMENTS

| | | |
|---|---|---|
| EP | 0221664 | 5/1987 |
| EP | 3647197 | 5/2020 |

OTHER PUBLICATIONS

Intellectual Property Office, United Kingdom Search Report dated May 20, 2021 in Application No. GB2018274.7.

*Primary Examiner* — Justin M Benedik
(74) *Attorney, Agent, or Firm* — Snell & Wilmer L.L.P.

(57) ABSTRACT

A leg restraint system for an ejection seat may comprise a leg restraint and a reel assembly coupled to the leg restraint. The reel assembly may include a drum configured to rotate about an axis. The leg restraint may be configured to wind around the drum in response to rotation of the drum about the axis.

20 Claims, 6 Drawing Sheets

(56) References Cited

U.S. PATENT DOCUMENTS

| | | | |
|---|---|---|---|
| 6,315,245 B1* | 11/2001 | Ruff | B64D 25/02 |
| | | | 244/122 AG |
| 6,336,656 B1* | 1/2002 | Romeo | B60R 21/18 |
| | | | 280/733 |
| 8,485,471 B2* | 7/2013 | Patterson | B64D 25/10 |
| | | | 244/122 AG |
| 9,517,841 B2* | 12/2016 | Ford | B60R 22/46 |
| 2011/0114790 A1* | 5/2011 | Patterson | B64D 25/02 |
| | | | 244/122 AG |
| 2021/0155348 A1* | 5/2021 | Holstine | B64D 11/062 |

* cited by examiner

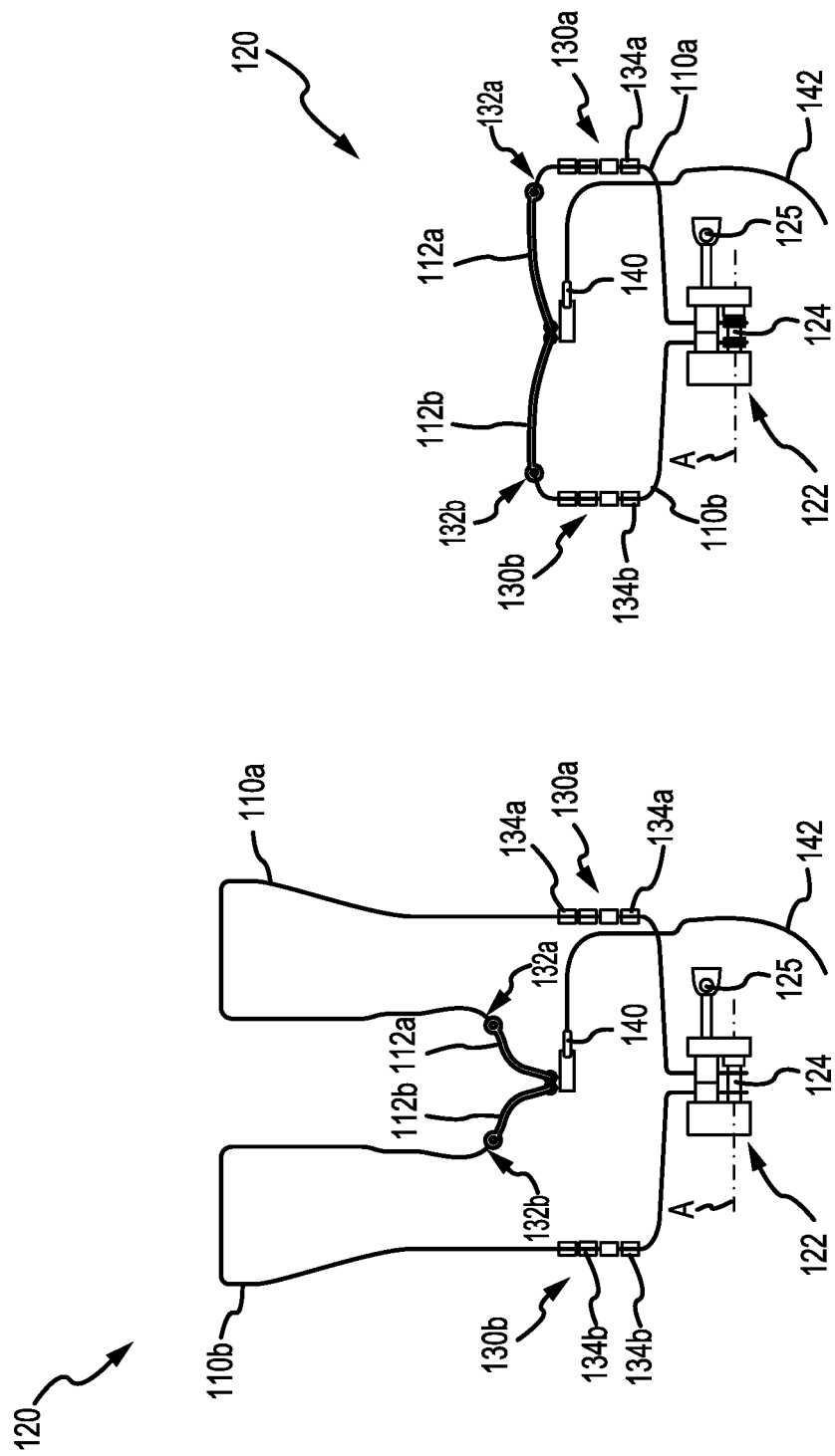

LEG RESTRAINT SYSTEM FOR EJECTION SEATS

FIELD

The present disclosure relates to ejection seats, and more specifically, to a leg restraint system for an ejection seat.

BACKGROUND

Ejection seats are designed to expel pilots from an aircraft. Upon initiation of an ejection sequence, the ejection seat may translate upward along rails as the seat is propelled out of the aircraft. Ejection seats generally include a leg restraint system, which is employed to restrain the seat occupant's leg during the ejection sequence, which tends to reduce leg flail upon the entering the windblast outside the cockpit. In this regard, it is desirable to deploy the leg restraint system while the seat is located inside the cockpit. Current leg restraint systems tend to include a mechanical attachment (e.g., a lanyard) between a fixed location on the aircraft and the leg restraints. The mechanical attachment is configured to translate the leg restraints to a retracted position, wherein the seat occupant's legs are restrained, in response to the ejection seat translating out of the aircraft. The mechanical attachment tends to take away energy from the rocket catapult used to propel the ejection seat, which may reduce overall aircraft clearance, terrain clearance, and/or eject system performance.

SUMMARY

A leg restraint system for an ejection seat is disclosed herein. In accordance with various embodiments, the leg restraint system may comprise a first leg restraint and a reel assembly coupled to the first leg restraint. The reel assembly may include a drum configured to rotate about an axis. The first leg restraint may be configured to wind around the drum in response to rotation of the drum about the axis.

In various embodiments, a gas source may be fluidly coupled to the reel assembly. The drum may be configured to rotate about the axis, in response to the reel assembly receiving a flow of gas from the gas source.

In various embodiments, a first anchor strap may be coupled to an end of the first leg restraint opposite the reel assembly. In various embodiments, a pully may be located between the reel assembly and the first anchor strap. The pully may include a wheel configured to rotate in a first circumferential direction. The pully may be configured to restrict rotation of the wheel in a second circumferential direction opposite the first circumferential direction. The first leg restraint may be located through the pully.

In various embodiments, a second leg restraint may be coupled to the reel assembly. In various embodiments, the second leg restraint may be configured to retract into the reel assembly in response to rotation of the drum about the axis.

In various embodiments, the drum may be configured to rotate in a first circumferential direction about the axis. The reel assembly may be configured to restrict rotation of the drum in a second circumferential direction opposite the first circumferential direction.

An ejection seat is also disclosed herein. In accordance with various embodiments, the ejection seat may comprise a seat pan, a first side panel located along a first side of the seat pan, and a second side panel located along a second side of the seat pan opposite the first side panel. A reel assembly may be located between the first side panel and the second side panel. The reel assembly may include a drum configured to rotate about an axis. A first leg restraint may be coupled to the reel assembly and configured to be wound around the drum.

In various embodiments, at least, a portion of the first leg restraint may be located through the first side panel. In various embodiments, a gas source fluidly may be coupled to the reel assembly. The drum may be configured to rotate about the axis in response to the reel assembly receiving a flow of gas from the gas source.

In various embodiments, an ejection handle may be configured to activate an ejection sequence. The gas source may be configured to supply the flow of gas to the reel assembly in response to actuation of the ejection handle.

In various embodiments, a first anchor strap may be coupled to an end of the first leg restraint opposite the reel assembly. In various embodiments, a releasable restraint may be coupled to the first anchor strap.

In various embodiments, a second leg restraint may be coupled to the reel assembly. The second leg restraint may be configured to retract into the reel assembly in response to rotation of the drum about the axis. A second anchor strap may be coupled to the fixed structure and an end of the second leg restraint opposite the reel assembly.

In various embodiments, the drum may be configured to rotate in a first circumferential direction about the axis. The reel assembly may be configured to restrict rotation of the drum in a second circumferential direction opposite the first circumferential direction.

A leg restraint system for an ejection seat, in accordance with various embodiments, may comprise a leg restraint and a reel assembly coupled to the leg restraint. The reel assembly may include a drum configured to rotate about an axis and an electromechanical motor configured to drive rotation of the drum. The leg restraint may be configured to wind around the drum in response to rotation of the drum about the axis.

In various embodiments, an electrical power supply may be operationally coupled to the electromechanical motor. In various embodiments, an anchor strap may be attached to an end of the leg restraint opposite the reel assembly.

In various embodiments, a releasable restraint may be coupled to the anchor strap. In various embodiments, the drum may be configured to rotate in a first circumferential direction about the axis. The reel assembly may be configured to restrict rotation of the drum in a second circumferential direction opposite the first circumferential direction.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIGS. 3A and 3B illustrate a leg restraint system in a non-retracted state and a retracted state, respectively, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
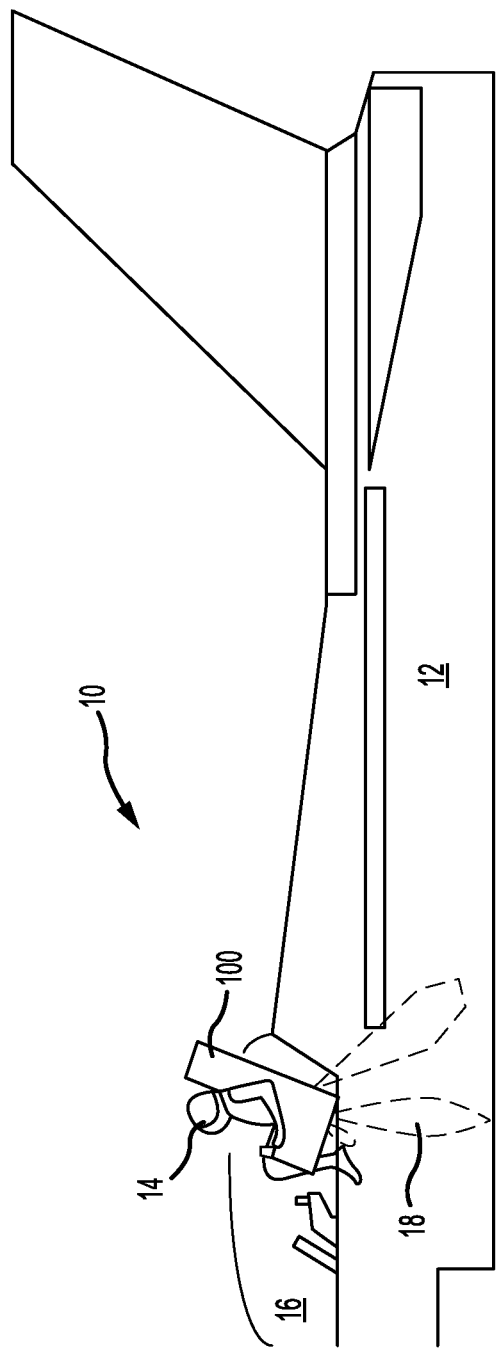
FIG. 1 illustrates an ejection seat being launched from an aircraft cockpit, in accordance with various embodiments.

With reference to FIG. 1, an aircraft ejection system 10 is shown, in accordance with various embodiments. Aircraft ejection system 10 may be installed in aircraft 12 to expel an ejection seat 100 and an occupant 14 of ejection seat 100 from a cockpit 16 of aircraft 12. Ejection seat 100 may be urged from cockpit 16 by a propulsion system 18. As described herein, ejection seat 100 may include a leg restraint system configured to translate to a retracted state, wherein the legs of occupant 14 are restrained, automatically in response to deployment of ejection system 10. In this regard, the leg restraint system may translate to the retracted state independent from the translation of ejection seat 100 out of cockpit 16 (i.e., without employing a mechanical connection to a fixed aircraft structure). In accordance with various embodiments, the leg restraint system may be configured to translate to the retracted state, while ejection seat 100 is located in cockpit 16. Thus, the leg restraint system may translate to a retracted state prior to the legs of occupant 14 entering the windblast (i.e., prior to the legs of occupant 14 entering the windblast being located outside cockpit 16).

Figure 2A:
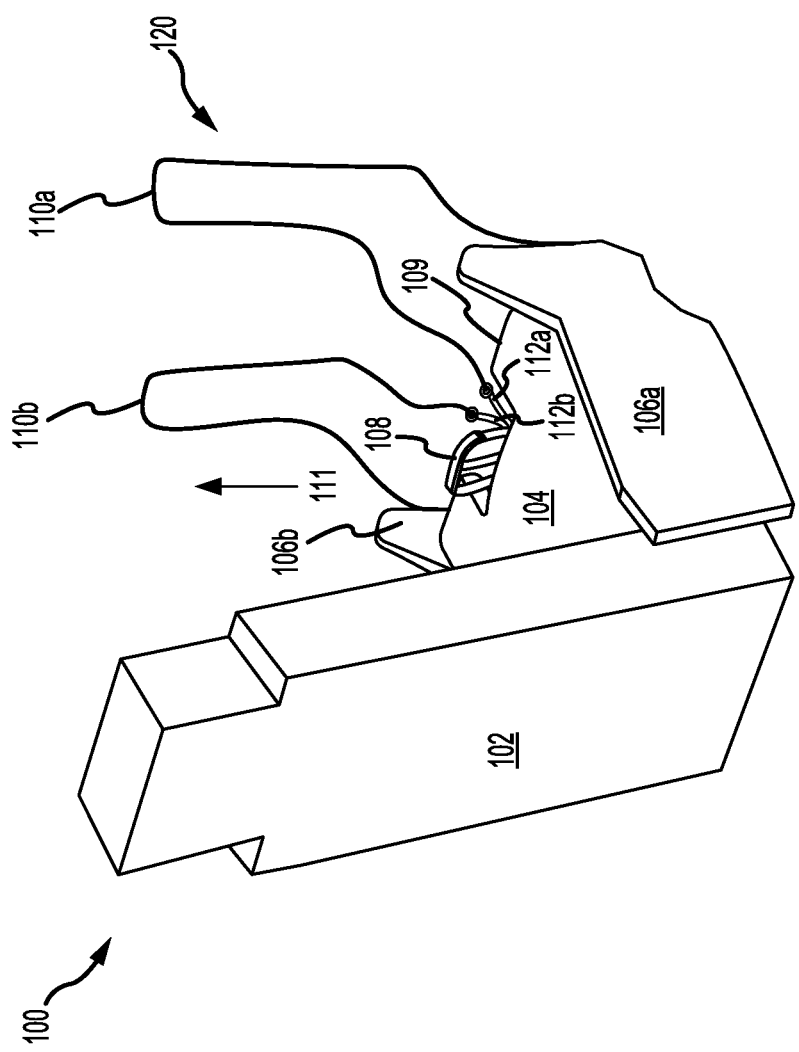
FIG. 2A illustrates a perspective view of an ejection seat having a leg restraint system in a non-retracted state, in accordance with various embodiments.
Figure 2B:
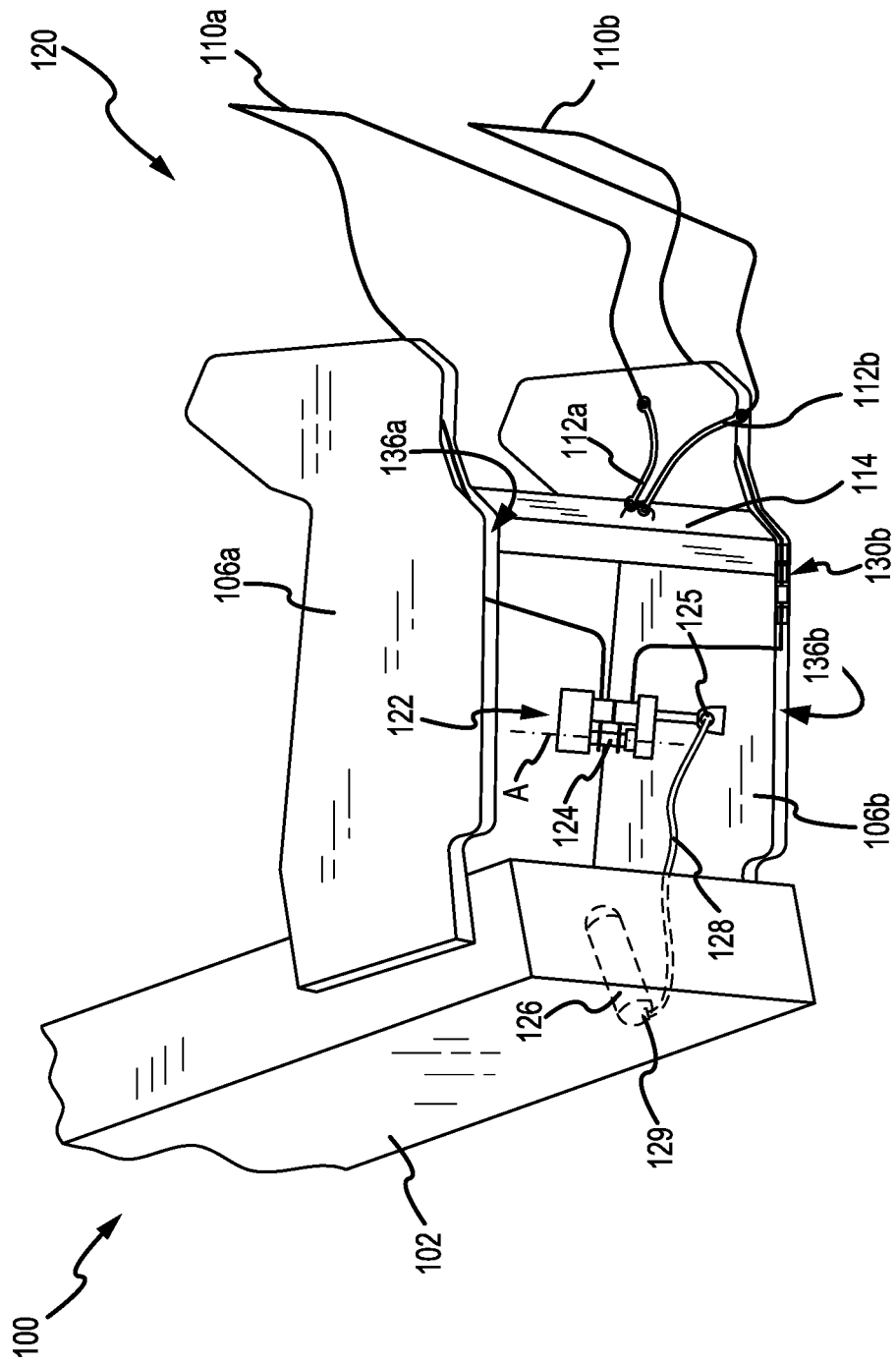
FIG. 2B illustrates an underside side view of the ejection seat of FIG. 2A with the leg restraint system in a non-retracted state, in accordance with various embodiments.

With reference to FIGS. 2A and 2B, ejection seat 100 including a leg restraint system 120 is illustrated. In FIGS. 2A and 2B, leg restraint system 120 is shown in the non-retracted state. In accordance with various embodiments, ejection seat 100 includes a seat back 102 and a seat pan 104. A first side panel 106a of ejection seat 100 is located along a first side of seat pan 104. A second side panel 106b of ejection seat 100 is located along a second side of seat pan 104, opposite first side panel 106a. In various embodiments, an ejection handle 108 may be located, for example, proximate a front side 109 of seat pan 104. Front side 109 of seat pan 104 is generally opposite seat back 102. While FIG. 2 shows ejection handle 108 as located at front side 109, it is further contemplated and understood that ejection handle 108 may be located anywhere that is accessible to an occupant of ejection seat 100. Ejection handle 108 may be configured to initiate an ejection sequence upon actuation. For example, occupant 14 (with momentary reference to FIG. 1) pulling ejection handle 108 in the direction of arrow 111 may initiate the ejection sequence, thereby causing ejection seat 100 to be expelled from cockpit 16.

In accordance with various embodiments, leg restraint system 120 may include a first leg restraint 110a and a second leg restraint 110b. First and second leg restraints 110a, 110b may comprise, for example, canvas, nylon, aramid fiber (e.g., sold under the mark KEVLAR®), polyethylene terephthalate, and/or any other suitable material. First leg restraint 110a may be coupled between a reel assembly 122 and a first anchor strap 112a. Second leg restraint 110b may be coupled between reel assembly 122 and a second anchor strap 112b.

In various embodiments, first and second anchor straps 112a, 112b may comprise an elastic material, such as natural rubber, synthetic rubber, or other suitable elastomer. First and second anchor straps 112a, 112b may be releasably attached to a fixed structure 114 of ejection seat 100. In various embodiments, fixed structure 114 may be a front panel of seat pan 104.

In accordance with various embodiments, reel assembly 122 may be located within an interior of ejection seat 100. In various embodiments, reel assembly 122 may be located between first side panel 106a and second side panel 106b. While reel assembly 122 is illustrated as located beneath the seat pan 104 of ejection seat 100 (i.e., between seat pan 104 and a floor of aircraft 12, with momentary reference to FIG. 1), it is further contemplated and understood that reel assembly 122 may be located in any desired location on ejection seat 100. For example, in various embodiments, reel assembly 122 may be located in seat back 102.

In accordance with various embodiments, reel assembly 122 includes a drum 124 around which first and second leg restraints 110a, 110b may be wound. Drum 124 is configured to rotate about a drum axis A in order to retract first and second leg restraints 110a, 110b. In this regard, reel assembly 122 may wind first and second leg restraints 110a, 110b about drum 124, thereby retracting first and second leg restraints 110a, 110b into reel assembly 122. In various embodiments, drum 124 may be pneumatically driven. In various embodiments, leg restraint system 120 includes a gas source 126. Gas source 126 may be a cylinder comprising a compressed gas, a solid gas generating material, or any other suitable gas supply. Gas source 126 may be fluidly coupled to reel assembly 122 via a conduit 128. Conduit 128 may be fluidly coupled to a gas input port 125 of reel assembly 122. Gas source 126 may supply gas to reel assembly 122 in response to initiation of the ejection sequence. Actuation of ejection handle 108 may cause gas source 126 to begin supplying gas to reel assembly 122. For example, actuation of ejection handle 108 may cause a valve 129 of gas source 126 to translate to an open position. In accordance with various embodiments, drum 124 is configured to rotate in response to reel assembly 122 receiving gas from gas source 126. Stated differently, the gas from gas source 126 may provide rotational power to drive a rotation of drum 124.

With reference to FIG. 3A, leg restraint system 120 is illustrated in the non-retracted state, with ejection seat 100 and gas source 126 removed for clarity. An end 132a of first leg restraint 110a may be attached to first anchor strap 112a. End 132a of first leg restraint 110a is opposite reel assembly 122. In this regard, a portion of first leg restraint 110a extends from reel assembly 122 to first anchor strap 112a. The length of first leg restraint 110a extending from reel assembly 122 to first anchor strap 112a decreases in response to rotation of drum 124 about drum axis A. An end 132b of second leg restraint 110b may be attached to second anchor strap 112b. End 132b of second leg restraint 110b is opposite reel assembly 122. In this regard, a portion of second leg restraint 110b extends from reel assembly 122 to second anchor strap 112b. The length of second leg restraint 110b extending from reel assembly 122 to second anchor strap 112b decreases in response to rotation of drum 124 about drum axis A.

In various embodiments, drum 124 is configured to rotate about axis A in a first circumferential direction. Reel assembly 122 may be configured to restrict rotation of drum 124 in a second circumferential direction opposite the first circumferential direction. For example, reel assembly 122 may include a ratchet and pawl, a sprag clutch, or the like configured to block or interfere with rotation of drum 124 in the second circumferential direction.

In various embodiments, one or more first pullies 130a may be located between first anchor strap 112a and reel assembly 122. First pullies 130a may each include a wheel 134a configured to rotate about an axis. First pullies 130a may be configured to allow wheels 134a to rotate in a first direction and to restrict rotation of wheels 134a in a second direction opposite the first direction. For example, each first pully 130a may include a ratchet and pawl, a sprag clutch, or the like configured to block or interfere with rotation of wheel 134a in the second direction. First leg restraint 110a may be located through first pullies 130a. First pullies 130a may reduce the load exerted on reel assembly 122 by first leg restraint 110a. In various embodiments, first pullies 130a may be located in an interior of ejection seat 100. For example, first pullies 130a may be located in a channel 136a (with momentary reference to FIG. 2B) defined by first side panel 106a. In various embodiments, at least a portion of first leg restraint 110a may be located through first side panel 106a and/or in channel 136a (with momentary reference to FIG. 2B).

One or more second pullies 130b may be located between second anchor strap 112b and reel assembly 122. Second pullies 130b may each include a wheel 134b configured to rotate about an axis. Second pullies 130b may be configured to allow wheels 134b to rotate in a first direction and to restrict rotation of wheels 134b in a second direction opposite the first direction. For example, each second pully 130b may include a ratchet and pawl, a sprag clutch, or the like configured to block or interfere with rotation of wheel 134b in the second direction. Second leg restraint 110b may be located through second pullies 130b. Second pullies 130b may reduce the load exerted on reel assembly 122 by second leg restraint 110b. In various embodiments, second pullies 130b may be located in an interior of ejection seat 100. For example, second pullies 130b may be located in a channel 136b (with momentary reference to FIG. 2B) defined by second side panel 106b. In various embodiments, at least a portion of second leg restraint 110b may be located through second side panel 106b and/or in channel 136b (with momentary reference to FIG. 2B).

Figure 4:
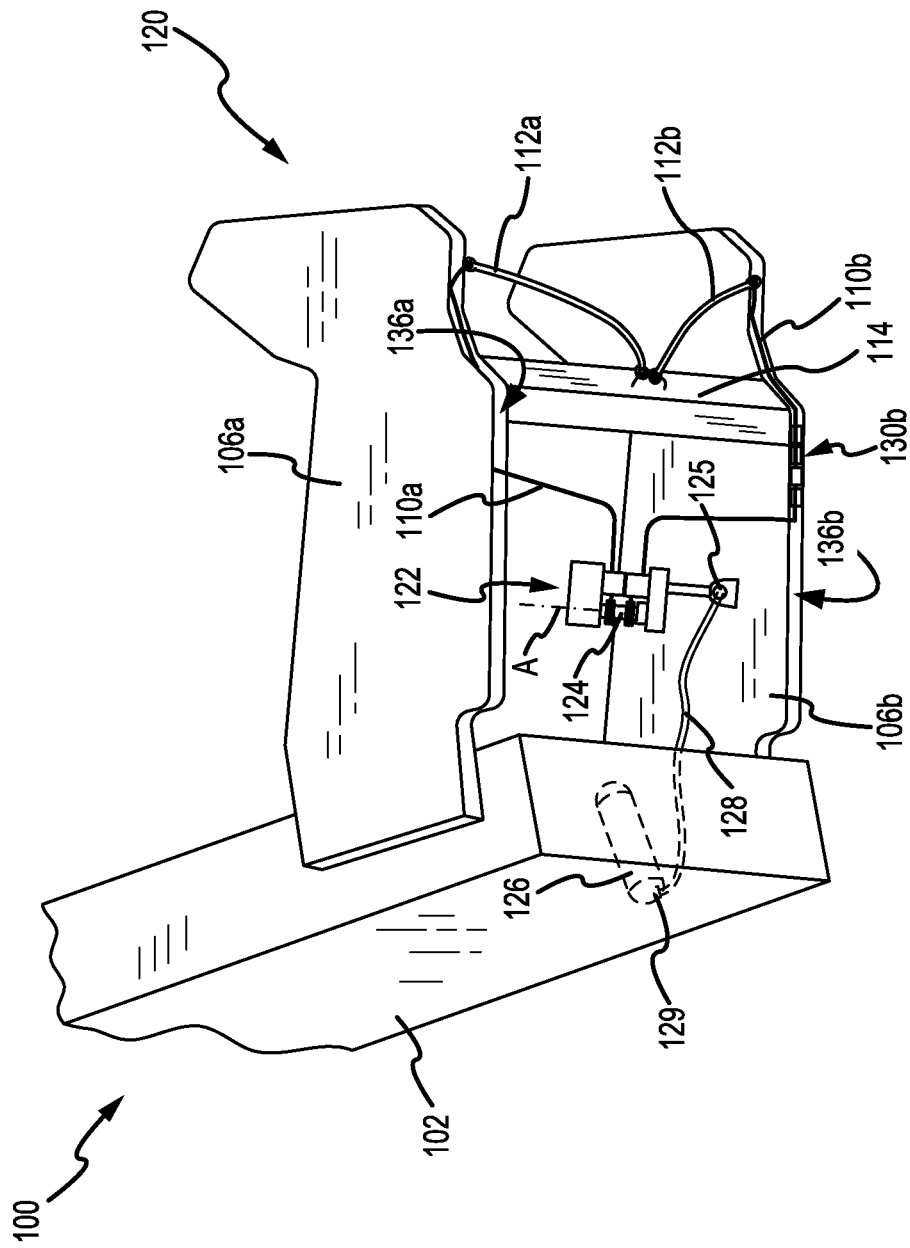
FIG. 4 illustrates an underside view of the ejection seat of FIG. 2A with the leg restraint system in a retracted state, in accordance with various embodiments.

With reference to FIG. 3B and FIG. 4, leg restraint system 120 is illustrated in the retracted state. In response to the flow of gas from gas source 126, drum 124 rotates about axis A, thereby winding first and second leg restraints 110a, 110b around drum 124. As first and second leg restraints 110a, 110b retract into reel assembly 122 (i.e., wind around drum 124), the length of first anchor strap 112a extending from reel assembly 122 to first anchor strap 112a and the length of second anchor strap 112b extending from reel assembly 122 to second anchor strap 112b decrease. In various embodiments, as first leg restraint 110a retracts into reel assembly 122 (i.e., winds around drum 124), first anchor strap 112a may be pulled, or translated, toward first pullies 130a and first side panel 106a. As second leg restraint 110b retracts into reel assembly 122 (i.e., winds around drum 124), second anchor strap 112b may be pulled, or translated, toward second pullies 130b and second side panel 106b. Translation of first and second leg restraints 110a, 110b into reel assembly 122 may cause first and second leg restraints 110a, 110b and/or first and second anchor straps 112a, 112b to translate the ankles of occupant 14 (with momentary reference to FIG. 1) inward and/or toward fixed structure 114. Reel assembly 122 restricting rotation of drum 124 in the second circumferential direction and may maintain the ankles and/or other limb portions of occupant 14 proximate fixed structure 114, which tends to reduce or prevent leg fail during the expulsion of ejection seat 100 (with momentary reference to FIG. 1).

In various embodiments, leg restraint system 120 may include a releasable restraint 140 coupled to first and second anchor straps 112a, 112b. Releasable restraint 140 may releasably couple first and second anchor straps 112a, 112b to fixed structure 114. An actuator 142 may be operationally coupled to releasable restraint 140. Actuator 142 may be configured to translate releasable restraint 140, thereby decoupling, or detaching, first and second anchor straps 112a, 112b from fixed structure 114. Actuator 142 may be configured to release releasable restraint 140 prior to occupant 14 (with momentary reference to FIG. 1) separating from ejection seat 100. For example, actuator 142 may be configured to release releasable restraint 140 prior to or simultaneously with parachute deployment.

First and second leg restraints 110a, 110b being retracted by a reel assembly located on ejection seat 100, as opposed to via a connection to a fixed aircraft structure, may increase ejection system performance by allowing more energy to remain in the ejection seat catapult. Leg restraint system 120 being contained on ejection seat 100 tends decrease seat installation time and may also reduce the opportunities for installation errors, as first and second leg restraints 110a, 110b do not rely on a connection to a fixed aircraft structure for retraction. Winding first and second leg restraints 110a, 110b about drum 124 may also reduce a risk of ejection components and/or the seat occupant becoming entangled with the retracted portions of first and second leg restraints 110a, 110b.

Figure 5:
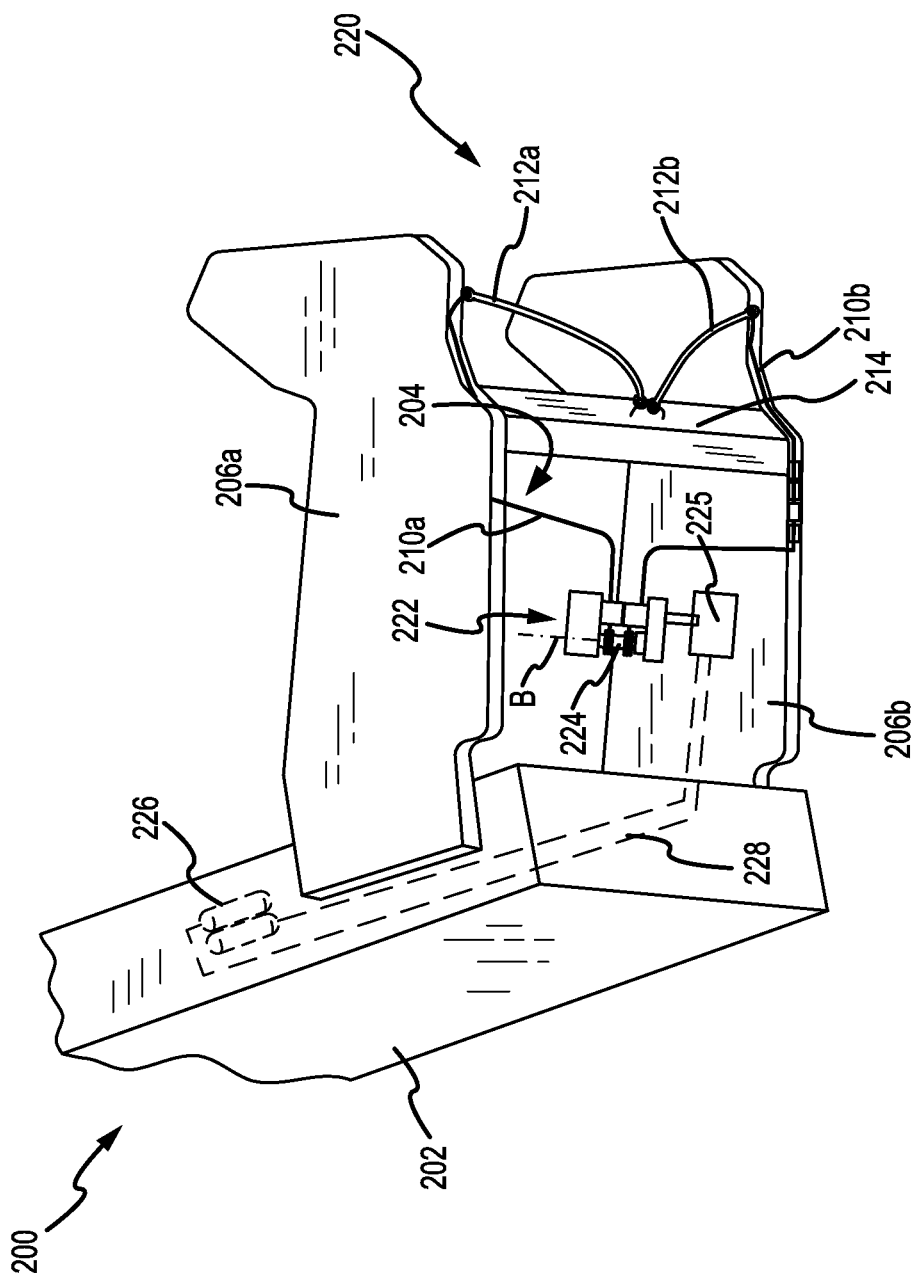
FIG. 5 illustrates an underside view of an ejection seat with a leg restraint system of the ejection seat in a retracted state, in accordance with various embodiments.

With reference to FIG. 5, an ejection seat 200 including a leg restraint system 220 is illustrated. In various embodiments, ejection seat 200 may replace ejection seat 100 in ejection system 10 (with momentary reference to FIG. 1). Leg restraint system 220 is shown in the retracted state. In accordance with various embodiments, ejection seat 200 includes a seat back 202, seat pan 204, first side panel 206a located along a first side of seat pan 204, and a second side panel 206b located along a second side of seat pan 204 opposite first side panel 206a. In accordance with various embodiments, leg restraint system 220 may include a first leg restraint 210a and a second leg restraint 210b, similar to first and second leg restraints 110a, 110b (with momentary reference to FIG. 2A). First leg restraint 210a may be coupled between a reel assembly 222 and a first anchor strap 212a. Second leg restraint 210b may be coupled between reel assembly 222 and a second anchor strap 212b. First and second anchor straps 212a, 212b may be releasably coupled to a fixed structure 214 of ejection seat 200, First and second anchor straps 212a, 212b may be releasably coupled to fixed structure 214 via a releasable restraint, similar to releasable restraint 140 (with momentary reference to FIGS. 3A and 3B).

Reel assembly 222 includes a drum 224 around which first and second leg restraints 210a, 210b may be wound. Drum 224 is configured to rotate about a drum axis B in order to retract first and second leg restraints 210a, 210b. Drum 224 may be configured to rotate about axis B in a first circumferential direction. Reel assembly 222 may be configured to restrict rotation of drum 224 in a second circumferential direction opposite the first circumferential direction. For example, reel assembly 222 may include a ratchet and pawl, a sprag clutch, or the like configured to block or interfere with rotation of drum 224 in the second circumferential direction.

In various embodiments, reel assembly 222 includes an electromechanical motor 225 configured to drive rotation of drum 224 about axis B. In various embodiments, leg restraint system 220 may include one or more electrical power supply(ies) 226 operationally coupled to electromechanical motor 225. An electrical signal may be provided to electromechanical motor 225 in response to activation of electrical power supplies 226. The electrical signal may be provided to electromechanical motor 225 via links 228. Links 228 may be a wired or wireless connection. Electromechanical motor 225 may rotate drum 224 in response to receiving the electrical signal (i.e., in response to activation of electrical power supplies 226). In various embodiments, actuation of an ejection handle, similar to ejection handle 108 (with momentary reference to FIG. 2A) may activate electrical power supplies 226. In this regard, actuation of the ejection handle may cause reel assembly 222 to retract first and second leg restraints 210a, 210b, thereby translating the ankles and/or other limb portions of an occupant of ejection seat 200 toward fixed structure 214. Electrical power supplies 226 may include one or more thermal batteries, or any other power source capable of providing an electrical signal to electromechanical motor 225.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A leg restraint system for an ejection seat, comprising:
a first leg restraint;
a reel assembly coupled to the first leg restraint, the reel assembly including a drum configured to rotate about an axis, the first leg restraint being configured to wind around the drum in response to rotation of the drum about the axis; and
a gas source fluidly coupled to a gas input port of the reel assembly, wherein gas received from the gas source drives a rotation of the drum about the axis.

2. The leg restraint system of claim 1, further comprising a first anchor strap coupled to an end of the first leg restraint opposite the reel assembly.

3. The leg restraint system of claim 2, further comprising a pully located between the reel assembly and the first anchor strap, the pully including a wheel configured to rotate in a first circumferential direction, wherein the pully is configured to restrict rotation of the wheel in a second circumferential direction opposite the first circumferential direction, and wherein the first leg restraint is located through the pully.

4. The leg restraint system of claim 1, further comprising a second leg restraint coupled to the reel assembly.

5. The leg restraint system of claim 4, wherein the second leg restraint is configured to retract into the reel assembly in response to rotation of the drum about the axis.

6. The leg restraint system of claim 5, wherein the drum is configured to rotate in a first circumferential direction about the axis, and wherein the reel assembly is configured to restrict rotation of the drum in a second circumferential direction opposite the first circumferential direction.

7. An ejection seat, comprising:
  a seat pan;
  a first side panel located along a first side of the seat pan;
  a second side panel located along a second side of the seat pan opposite the first side panel;
  a fixed structure located proximate a front side of the seat pan and between the first side panel and the second side panel;
  a reel assembly located between the first side panel and the second side panel, the reel assembly including a drum configured to rotate about an axis; and
  a first leg restraint coupled to the reel assembly and the fixed structure, wherein the first leg restraint is configured to be wound around the drum.

8. The ejection seat of claim 7, wherein, at least, a portion of the first leg restraint is located through the first side panel.

9. The ejection seat of claim 7, further comprising a gas source fluidly coupled to the reel assembly, wherein the drum is configured to rotate about the axis in response to the reel assembly receiving a flow of gas from the gas source.

10. The ejection seat of claim 9, further comprising an ejection handle configured to activate an ejection sequence, wherein the gas source is configured to supply the flow of gas to the reel assembly in response to actuation of the ejection handle.

11. The ejection seat of claim 7, further comprising:
  a first anchor strap coupled to the fixed structure of the ejection seat and to an end of the first leg restraint opposite the reel assembly.

12. The ejection seat of claim 11, further comprising a releasable restraint coupled to the first anchor strap.

13. The ejection seat of claim 12, further comprising:
  a second leg restraint coupled to the reel assembly, the second leg restraint being configured to retract into the reel assembly in response to rotation of the drum about the axis; and
  a second anchor strap coupled to the fixed structure and an end of the second leg restraint opposite the reel assembly.

14. The ejection seat of claim 7, wherein the drum is configured to rotate in a first circumferential direction about the axis, and wherein the reel assembly is configured to restrict rotation of the drum in a second circumferential direction opposite the first circumferential direction.

15. The ejection seat of claim 7, wherein the fixed structure is a front panel of the seat pan.

16. A leg restraint system for an ejection seat, comprising:
  a leg restraint; and
  a reel assembly coupled to the leg restraint, the reel assembly including:
    a drum configured to rotate about an axis, the leg restraint being configured to wind around the drum in response to rotation of the drum about the axis; and
    an electromechanical motor configured to drive rotation of the drum.

17. The leg restraint system of claim 16, further comprising an electrical power supply operationally coupled to the electromechanical motor.

18. The leg restraint system of claim 17, further comprising an anchor strap attached to an end of the leg restraint opposite the reel assembly.

19. The leg restraint system of claim 18, further comprising a releasable restraint coupled to the anchor strap.

20. The leg restraint system of claim 19, wherein the drum is configured to rotate in a first circumferential direction about the axis, and wherein the reel assembly is configured to restrict rotation of the drum in a second circumferential direction opposite the first circumferential direction.

* * * * *